Feb. 8, 1955
M. SCHWARTZ ET AL
2,701,500
RANGE FINDING UNIT, INCLUDING A VIEWING RANGE
FINDER AND A LIGHT BEAM PROJECTING RANGE
FINDER FOR PHOTOGRAPHIC PURPOSES
Filed March 9, 1951
2 Sheets-Sheet 1
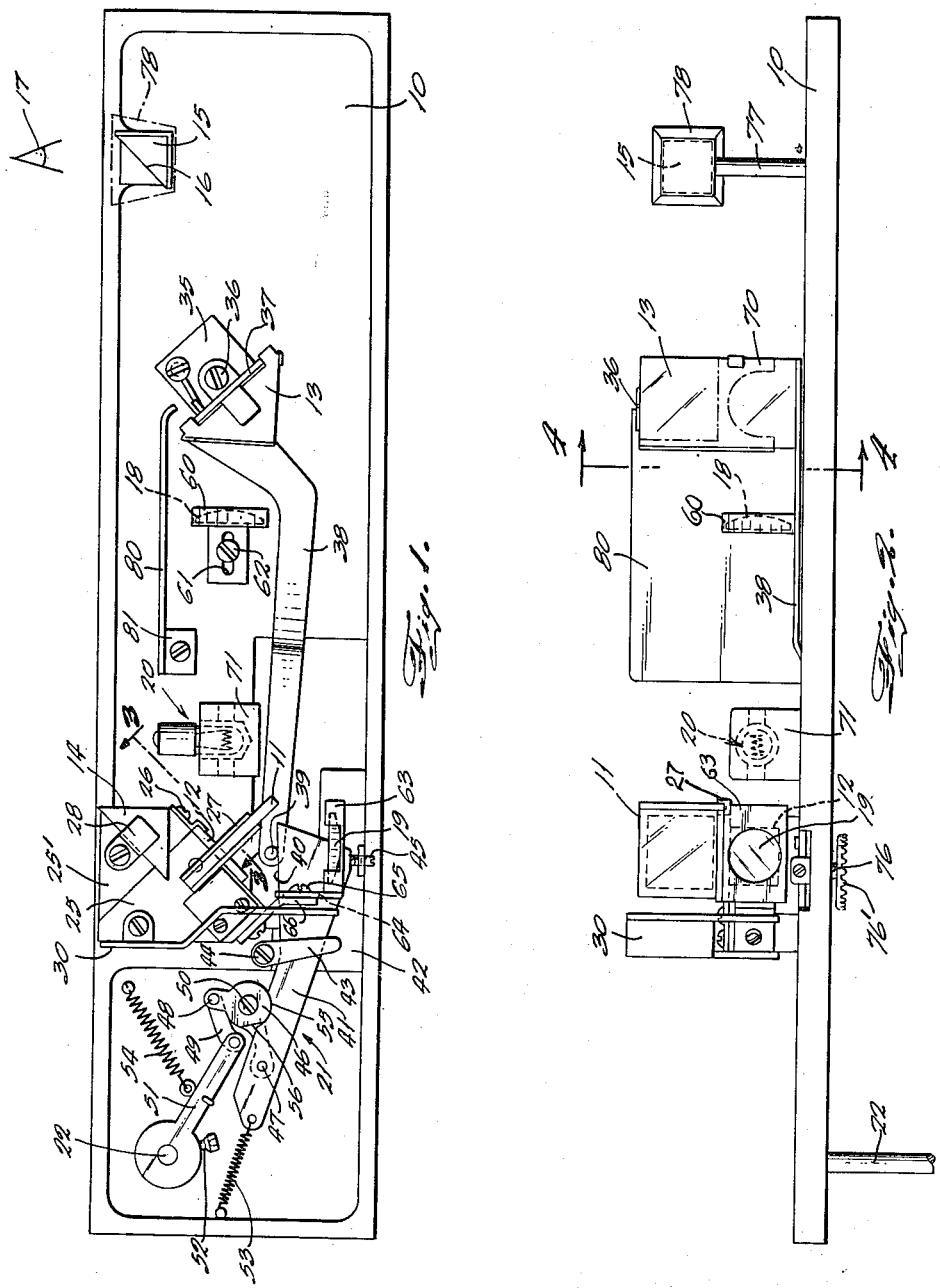
INVENTORS
MORRIS SCHWARTZ
WILLIAM CASTEDELLO
BY
ATTORNEY Feb. 8, 1955
M. SCHWARTZ ET AL
2,701,500
RANGE FINDING UNIT, INCLUDING A VIEWING RANGE
FINDER AND A LIGHT BEAM PROJECTING RANGE
FINDER FOR PHOTOGRAPHIC PURPOSES
Filed March 9, 1951
2 Sheets-Sheet 2
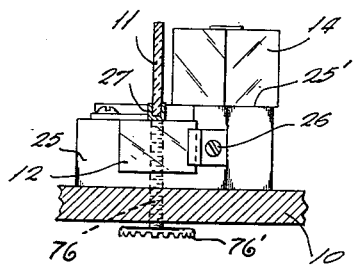
Fig. 3
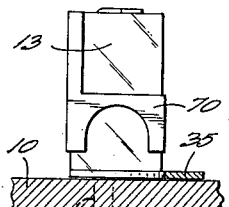
Fig. 4
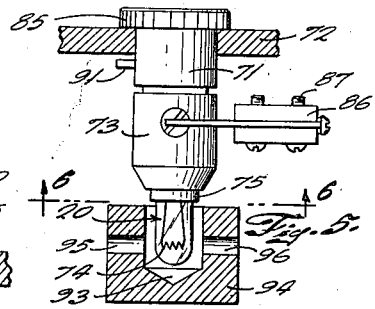
Fig. 5
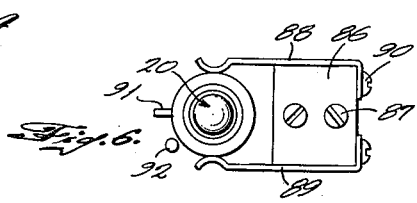
Fig. 6
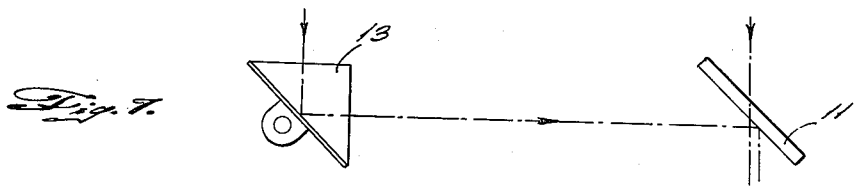
Fig. 7
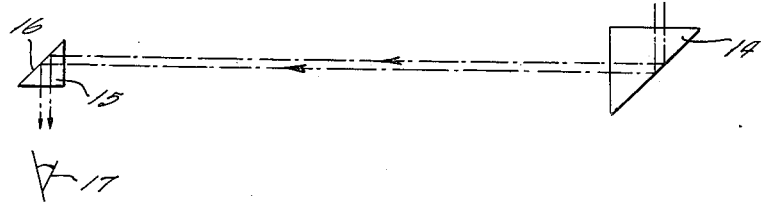
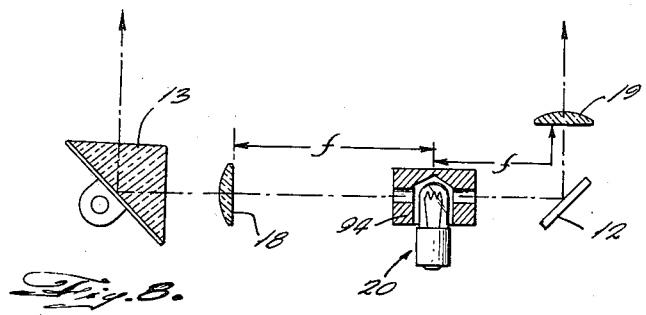
Fig. 8
INVENTORS
MORRIS SCHWARTZ
WILLIAM CASTEDELLO
BY
ATTORNEY United States Patent Office 2,701,500
Patented Feb. 8, 1955

2,701,500

RANGE FINDING UNIT, INCLUDING A VIEWING RANGE FINDER AND A LIGHT BEAM PROJECTING RANGE FINDER FOR PHOTOGRAPHIC PURPOSES

Morris Schwartz and William Castedello, Plainville, Conn., assignors to The Kalart Company Inc., Plainville, Conn.

Application March 9, 1951, Serial No. 214,736

5 Claims. (Cl. 88—2.4)

This invention relates to a viewing range finder and a light beam projecting range finder unit for photographic purposes, particularly to a unit of this type designed for mounting within the casing of a photographic camera and controlled by the focusing movement of the camera lens.

It will be evident, that the space available in the casing of a camera, even of a comparatively large camera such as a so-called press camera, is rather limited. As a result, it is difficult from a manufacturing view point to find room for all the necessary components of the finders without reducing the individual components to a size which makes the same too delicate and interferes with a satisfactory range finding operation.

One of the objects of the present invention is to provide a combination unit of the general type, above referred to, which is so compact in design that it can be conveniently fitted in the space generally available in a camera casing without sacrificing the accuracy and reliability of the range finding operation and without reducing the sharpness of vision through the system.

Another object of the invention is to provide a novel and improved combination unit of the general type, above referred to, which is simple in design and requires comparatively few individual components. These advantages are attained by structurally combining some of the optical components of the viewing range finder and the light beam projecting range finder.

Another more specific object of the invention, allied with the preceding one, is to reduce the total space occupied by the two range finders by arranging some of the finder components one above the other and by a novel arrangement of the image forming lenses of the light beam projecting range finder.

Other and further objects, features and advantages of the invention will be pointed out hereinafter and set forth in the appended claims forming part of the application.

In the accompanying drawing a now preferred embodiment of the invention is shown by way of illustration and not by way of limitation.

In the drawing:

Fig. 1 is a plan view of a lens coupled range finding combination unit according to the invention.

Fig. 2 is an elevational side view of Fig. 1.

Fig. 3 is a section taken on line 3—3 of Fig. 1.

Fig. 4 is a section taken on line 4—4 of Fig. 2.

Fig. 5 is a section of the lamp holder on an enlarged scale.

Fig. 6 is a plan view of Fig. 5 seen along line 6—6 of Fig. 5.

Fig. 7 is a diagram of the optical system of the viewing range finder, and

Fig. 8 is a diagram of the light beam projecting range finder of the unit.

Referring first to Figs. 1 to 6, the entire range finding unit is mounted upon a base plate 10 which should be visualized as a partition wall in a camera casing. The stationary reflector of the viewing range finder is designated by 11 and the stationary reflector of the light beam projecting range finder is designated by 12. Reflector 11 is a semi-transparent mirror and partially coated for this purpose. Mirror 11 acts as a beam splitter in a conventional manner. Reflector 12 is a solidly silvered mirror. The pivotal reflectors of the two range finders are formed by a common reflector 13 shown as a prism.

The optical components of the viewing range finder further comprise a stationary reflector 14 shown as a prism which reflects images viewable on the beam splitter to a stationary reflector 15 having a reflecting surface 16. The position of the eye of the observer is indicated at 17.

The light beam projecting range finder comprises, in addition to the aforementioned components, an image forming lens 18 disposed in the optical center axis between mirror 12 and prism 13 and an image forming lens 19 disposed between mirror 11 and an exterior object, the range of which is to be determined. The last mentioned range finder further includes a source of light shown as an incandescent light bulb, generally designated by 20.

The common prism 13 is pivoted by moving means, generally designated by 21. These moving means are controlled in a conventional manner by the focusing movement of the camera lens and should be visualized as being coupled with the lens carrier by means of a shaft 22 which is rotated by a displacement of the lens carrier on the camera bed. It is believed that the coupling between shaft 22 and the lens camera is not essential for the understanding of the invention and it is, therefore, not shown in detail.

Referring now to Figs. 7 and 8, Fig. 7 shows a diagram of the optical system of the viewing range finder and Fig. 8 of the light beam projecting range finder.

As will be apparent from Fig. 7, a light beam reaching beam splitter 11 from an exterior object to be observed will pass through the beam splitter and is reflected by prisms 14 and 15 to the eye 17 of the observer. A second beam from the object will be reflected by pivotal prism 13 to beam splitter 11, then by the beam splitter to prism 14, and finally by prism 14 to prism 15. As a result, an observer can view two images of the object on the reflecting surface 16 of prism 15, the relative position of the two images being controlled by the angular position of prism 13 which, in turn, is controlled by the focusing movement of the lens in a manner well understood in the art.

According to Fig. 8, a light beam will be projected toward the object by stationary mirror 12 through lens 19 and a second light beam through lens 18 by pivotal prism 13. As will be obvious, due to the image forming lenses 18 and 19, the observer will see two images of the filament of lamp 20 on the object, the relative position of said images being again controlled by the angular position of prism 13.

Reverting again to Figs. 1 and 2 and also referring to the companion Figs. 3, 4, 5 and 6, the structural features of the range finding unit will now be described in detail.

As can best be seen on Fig. 1 a bracket or block 25 is fixedly secured to base plate 10. This block has a slanted side wall to which is secured mirror 12 by any suitable means such as screws 26. The top of block 25 is flat and supports the mountings of beam splitter 11 and prism 14. Beam splitter 11 and prism 14 can be mounted in any suitable manner, a frame 27 and a bracket 28 being indicated by way of illustration. It is essential to note in this connection that mirror 12 and beam splitter 11 are mounted substantially one above the other, mirror 12 being disposed at the lower level relative to the base plate 10. Prism 14 is disposed in the upper level and in substantially the same horizontal plane with beam splitter 11.

Block 25 may further support a shield 30 which serves to prevent stray light to enter the section of the compartment to the left of the optical systems of the range finders (as seen in Figs. 1 and 2) which section may serve to house for instance the optical system of a view finder.

Prism 13, which of course could be replaced by a mirror, is pivotally mounted on the base plate by means of a bracket 35 and pivots about a shaft 36. As can best be seen on Fig. 2, prism 13 is elongated to extend through the level of mirror 12 to the level of beam splitter 11. While it is preferable and also shown to make prism 13 out of one piece, it will be apparent that this prism could also be made of two sections, one on top of the other. Prism 13 is secured to a suitable mounting 37 which pivots together with the prism and is attached to or integral with a lever 38 the free end of which supports a pin 39 coacting with a cam or wedge surface 40 of a lever 41. This lever is slidably guided between a rib 42 of base plate 10 and a finger 43 secured to rib 42 for instance by a screw 44. Lever 41 is further guided by an adjustment screw 45 engaging an edge of lever 41. It will be apparent that adjustment of screw 45 will vary the path of engagement between pin 39 and wedge surface 40 and, thereby, also the ratio of transmission between the rotation of shaft 22 and the angular position of prism 13. One arm of a two-arm lever 46 is pivoted to lever 41 by a pivot pin 47 and the other arm of this lever is pivoted by a pivot pin 48 to an arm 49. Lever 46 is pivotal about a pivot 50. Arm 49 is pivoted to an arm 51 which in turn is fixedly secured to shaft 22, for instance by means of a screw 52. Springs 53 and 54, secured on one end to base plate 10 and on the other end to arm 51 and lever 41 respectively, load the entire system so that wedge surface 40 is always biased against pin 39 and a notch 55 is biased against a limiting edge 56 of lever 46.

The entire hereinbefore described system of moving means 21 is mounted in the lower level or plane or closely adjacent to base plate 10. As will be apparent, a certain angular rotation of shaft 22 will result in a corresponding pivotal movement of prism 13, thereby jointly varying the angular position of the pivotal reflecting surfaces of both the range finders.

Image forming lens 18 is secured to base plate 10 by means of a mounting 60 which can be adjusted in the direction of the optical axis of the lens by means of an elongated slot 61 and a screw 62. Similarly, lens 19 is secured to block 25 by means of a mounting frame 63 and can be adjusted in the direction of its optical axis by means of an elongated slot 64 and a screw 65 engaging a bracket 66 secured to block 25.

A mask 70 on the lower half of prism 13 limits the effective reflecting surface of this prism in accordance with the diameter of lens 18.

Lamp 20 is inserted in a lamp holder of suitable design. This lamp holder is shown as comprising a metal sleeve 71 which is rotatably fitted in a wall 72 which may be visualized as part of the camera casing. Sleeve 71 supports an insulation sleeve 73 in which is fitted a metal sleeve 75 which serves to receive the base of lamp 20. The terminals of the lamp are connected in a conventional manner to a source of current, usually a battery disposed within the camera casing. The entire lamp holder can be rotated by means of a knurled head 85 accessible from the outside of the camera. To secure the holder in a selected rotary position an insulation block 86 is secured by screws 87 to a bracket extending from base plate 10 (not shown). The insulation block supports two springs 88 and 89 secured to block 86 by screws 90. These springs engage frictionally sleeve 73 thereby holding the lamp holder in position. A pin 91 extending from sleeve 71 and engageable with a stationary stop 92 secured to base plate 10 or part of the camera casing serves to limit the rotational movement of the lamp holder.

The globe of the lamp extends into an axial bore 93 of a block 94 made of opaque material and secured to base plate 10. Block 94 further includes two channels or bores 95 and 96 extending from the central bore 93 and positioned in alignment with the lamp filament 74 and the optical center axis between reflectors 11 and 13. Lamp 20 is of the type having a filament 74 in form of a substantially cylindrical coil and is so inserted in the lamp holder that the long axis of the filament coil is parallel to the aforementioned optical axis. As a result, the two images of the lamp filament which are projected by the light beams of the range finder appear as circles which can be conveniently and accurately placed in a superimposed position.

As previously mentioned, frame 27 of the beam splitter 11 of the viewing range finder is mounted on the top of block 25. The position of the beam splitter can be adjusted by means of a screw 76. Rotation of this screw by means of a crown wheel 76' causes the beam splitter to be tilted slightly in its own plane for purposes of adjustment.

The reflecting prism 14 of the viewing range finder is also mounted on block 25 or more specifically on a raised portion 25' thereof so that prism 14 is at the correct level relative to the beam splitter, as can best be seen on Fig. 3. The viewing prism 15 of the viewing range finder is mounted on the same level as prism 14 by means of a post 77 secured to base plate 10. A mask or screen 78 may be provided to prevent stray light from lamp 20 to reach prism 15 and to disturb thereby the observer when viewing the images on the prism. The optical systems of the range finders may further be shielded against stray light by a shield 80 secured to base plate 10 by an ear 81.

As will appear from the previous description, the optical systems of the two range finders are disposed in two different planes parallel one to the other. The only movable optical components of the two finders, namely the pivotal reflector, are combined in the single element 13 so that the same moving means 21 can be used for the pivotal reflectors of both the finders. Furthermore, one of the image forming lenses is disposed between the respective reflectors. Finally, the provision of the reflectors 14 and 15 permits to view the two images of the viewing range finder in a position very closely adjacent to the position normally occupied by the eye of the observer when the observer uses the view finder of a camera of the type here in question. This view finder, as previously mentioned, may be visualized as being disposed in the compartment to the left of shield 30. As a result, only a slight shift of the eyeball of the observer is necessary to switch from the viewing operation to the range finding operation.

The result of the aforedescribed structural arrangement of all the optical and mechanical components of the range finders is a very compact design which can be conveniently mounted within the available space of a camera casing without requiring an undue reduction of the size of the individual components.

While the invention has been described in detail with respect to a certain now preferred example and embodiment of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A photographic range finding unit comprising a viewing range finder and a light beam projecting range finder, the said viewing range finder including a semitransparent stationary reflector through which an image of an object exterior to the said range finder is viewable, a pivotal reflector disposed in optical and spacial alignment with the stationary reflector so as to reflect a second image of the exterior object to the stationary reflector, and reflecting and viewing means optically associated with the stationary reflector for viewing the said two images; the said light beam projecting range finder including a stationary reflector, a pivotal reflector, a holder for a source of light disposed between the two reflectors of the light beam projecting range finder, the said stationary reflector, the said pivotal reflector and the said holder of the light beam projecting range finder being disposed in optical alignment an image forming lens between said light holder and the respective pivotal reflector in optical alignment therewith, and a second image forming lens between the respective stationary reflector and said exterior object in optical alignment therewith, thereby causing each of the two reflectors of the light beam projecting range finder to reflect a light beam emanating from a source of light in said holder toward the said exterior object, respective reflectors of the two range finders being disposed one above the other substantially in alignment one with the other, the said pivotal reflectors of the range finders being formed by a single pivotally mounted reflecting member including a light deviating surface having a portion in optical and spacial alignment with the stationary reflector of one of the range finders for the purpose aforesaid and a second portion in optical and spacial alignment with the stationary reflector of the other range finder for the purpose aforesaid, and moving means coupled with said pivotal member for varying the angular position of the said pivotal reflectors.

2. A range finding unit as defined in claim 1, wherein the aforementioned components of one of said range finders are disposed substantially in one layer and the aforementioned components of the other range finder substantially in a second layer generally parallel to and above the first layer, and wherein said light deviating surface of the pivotal reflecting member extends through both said layers.

3. A range finding unit as defined in claim 2, wherein the said pivotal reflecting member is a single prism elongated to extend through both said layers having their reflecting surfaces in the same plane.

4. A range finding unit as defined in claim 1, in combination with a base plate on which said pivotal reflecting member, a bracket having a side wall and a top wall, said image forming lenses, said reflecting and viewing means, and said light holder are mounted, said bracket supporting on said side wall the stationary deflector for the light beam projecting range finder and on its top wall the stationary reflector for the viewing range finder.

5. A range finding unit comprising a base plate, a viewing range finder and a light beam projecting range finder mounted on said base plate, the said viewing range finder including a semi-transparent stationary reflector through which an image of an object exterior to the said range finder is viewable, a pivotal reflector disposed in optical and spacial alignment with the stationary reflector so as to reflect a second image of the exterior object to the stationary reflector, and reflecting and viewing means optically associated with the stationary reflector for viewing the said two images; the said light beam projecting range finder including a stationary reflector, a pivotal reflector, a holder for a source of light disposed between the two reflectors of the light beam projecting range finder, the said stationary reflector, the said pivotal reflector and the said holder of the light beam projecting range finder being disposed in optical alignment, an image forming lens between said light holder and the respective pivotal reflector in optical alignment therewith, and a second image forming lens between the respective stationary reflector and said exterior object, thereby causing each of the two reflectors of the light beam projecting range finder to reflect a light beam emanating from a source of light in said holder toward the said exterior object, the reflectors and the viewing means of the viewing range finder being disposed substantially in one layer parallel to the base plate, and the reflectors, the lenses and the light holder of the light beam projecting range finder being disposed in a second layer situated between the said first layer and the base plate parallel to the first layer and the plate, respective reflectors of the two range finders being disposed one above the other substantially in transverse alignment relative to said layers, the said pivotal reflectors of the range finders being formed by a single pivotally mounted reflecting member including a light deviating surface having a portion in optical alignment with the stationary reflector of one of the range finders and a second portion in optical alignment with the stationary reflector of the other range finder, both said portions being in one plane, and moving means coupled with said pivotal member for varying the angular position of the said pivotal reflectors, the said moving means being disposed substantially in the second parallel layer.

References Cited in the file of this patent

UNITED STATES PATENTS

| | | |
|---|---|---|
| 1,489,838 | Kohler | Apr. 8, 1924 |
| 2,101,543 | Henkel | Dec. 7, 1937 |
| 2,151,124 | Leitz | Mar. 21, 1939 |
| 2,376,982 | Schwartz et al. | May 29, 1945 |
| 2,379,698 | Fischer | July 3, 1945 |
| 2,397,160 | Schwartz et al. | Mar. 26, 1946 |
| 2,403,308 | Schwartz et al. | July 2, 1946 |
| 2,547,232 | Schwartz et al. | Apr. 3, 1951 |